United States Patent
Step et al.

(10) Patent No.: US 9,546,286 B2
(45) Date of Patent: Jan. 17, 2017

(54) HIGH RESISTIVITY COATING COMPOSITIONS HAVING UNIQUE PERCOLATION BEHAVIOR, AND ELECTROSTATIC IMAGE DEVELOPING SYSTEMS AND COMPONENTS THEREOF INCORPORATING SAME

(75) Inventors: Eugene N. Step, Newton, MA (US); Andriy Korchev, Billerica, MA (US); Agathagelos Kyrlidis, Cambridge, MA (US); Clovis D. Haynes, Carlisle, MA (US); Gregory R. Schulz, Reading, MA (US); John R. Szwec, Hudson, NH (US)

(73) Assignee: Cabot Corporation, Boston, MA (US)

(*) Notice: Subject to any disclaimer, the term of this patent is extended or adjusted under 35 U.S.C. 154(b) by 99 days.

(21) Appl. No.: 14/233,457

(22) PCT Filed: Jul. 20, 2012

(86) PCT No.: PCT/US2012/047500
§ 371 (c)(1),
(2), (4) Date: Jan. 17, 2014

(87) PCT Pub. No.: WO2013/016149
PCT Pub. Date: Jan. 31, 2013

(65) Prior Publication Data
US 2014/0126936 A1    May 8, 2014

Related U.S. Application Data

(60) Provisional application No. 61/510,737, filed on Jul. 22, 2011.

(51) Int. Cl.
C09C 1/48    (2006.01)
C09D 7/12    (2006.01)
(Continued)

(52) U.S. Cl.
CPC ............ C09D 7/1208 (2013.01); C08K 9/04 (2013.01); C09C 1/48 (2013.01); C09C 3/08 (2013.01);
(Continued)

(58) Field of Classification Search
CPC .......... C09D 7/1208; C09C 1/48; C09C 3/08; G03G 15/0233; G03G 15/0815; G03G 15/1685; C01P 2006/40
(Continued)

(56) References Cited

U.S. PATENT DOCUMENTS

| 2,297,691 A | 10/1942 | Carlson |
| 3,666,363 A | 5/1972 | Tanaka et al. |

(Continued)

FOREIGN PATENT DOCUMENTS

| DE | EP 1304362 A1 * | 4/2003 | ............ B82Y 30/00 |
| EP | 1304362 A1 | 4/2003 | |

(Continued)

OTHER PUBLICATIONS

International Search Report and the Written Opinion of the International Searching Authority, or the Declaration of International Application No. PCT/US2012/047500, mailed on Oct. 2, 2012.

(Continued)

*Primary Examiner* — Harold Pyon
*Assistant Examiner* — Danny N Kang

(57) ABSTRACT

Disclosed herein are resistive composites comprising at least one resin; at least one carbon black having a surface hydrophobically modified with at least one organic group, the at least one organic group having a molecular weight of the composite of 4000 or less and comprising the formula —X(G)-, wherein X is directly attached to the at least one carbon black and is selected from arylene, heteroarylene, and alkylene, G is a substituent of X, and —X(G)- is (Continued)

nonionic; and wherein the resistive composite has a volume resistivity, $R_v$, at a relative volume fraction, $X_{CB}$, of the at least one carbon black in the coating, where $R_v$ is at least $10^6$ ohm-cm; and log $R_v$ has a substantially linear relationship with $X_{CB}$ when $X_{CB}$ is varied from 0.1 to 0.5. Also disclosed are coatings made from such composites, such as coatings for rollers/belts for office automation machines, and methods of making such coatings.

19 Claims, 6 Drawing Sheets

(51) Int. Cl.
   *C09C 3/08* (2006.01)
   *G03G 15/00* (2006.01)
   *C08K 9/04* (2006.01)
   *G03G 15/02* (2006.01)
   *G03G 15/08* (2006.01)
   *G03G 15/16* (2006.01)

(52) U.S. Cl.
   CPC ...... *G03G 15/0233* (2013.01); *G03G 15/0815* (2013.01); *G03G 15/1685* (2013.01); *C01P 2006/40* (2013.01)

(58) Field of Classification Search
   USPC ........................................................ 252/500
   See application file for complete search history.

(56) References Cited

U.S. PATENT DOCUMENTS

| | | |
|---|---|---|
| 4,071,361 A | 1/1978 | Marushima |
| 5,200,164 A | 4/1993 | Medalia et al. |
| 5,489,498 A | 2/1996 | Ohno et al. |
| 5,744,276 A | 4/1998 | Ohno et al. |
| 5,942,366 A | 8/1999 | Ohno et al. |
| 6,002,895 A | 12/1999 | Kasuya et al. |
| 6,397,034 B1 | 5/2002 | Tarnawskyj et al. |
| 6,399,202 B1 | 6/2002 | Yu et al. |
| 6,409,815 B1 | 6/2002 | Hennemann et al. |
| 6,458,458 B1 | 10/2002 | Cooke et al. |
| 6,929,889 B2 * | 8/2005 | Belmont ............... B41C 1/05 430/108.1 |
| 7,807,321 B2 | 10/2010 | Step et al. |
| 2004/0138342 A1 | 7/2004 | Luethge et al. |
| 2005/0034629 A1 | 2/2005 | Belmont et al. |
| 2010/0055463 A1 | 3/2010 | Wu |
| 2010/0279103 A1* | 11/2010 | Wu ................... G03G 15/162 428/323 |

FOREIGN PATENT DOCUMENTS

| | | |
|---|---|---|
| EP | 2246749 A2 | 11/2010 |
| WO | WO 99/31175 | 6/1999 |

OTHER PUBLICATIONS

International Preliminary Report on Patentability of International Application No. PCT/US2012/047500, mailed on Feb. 6, 2014.

* cited by examiner

HIGH RESISTIVITY COATING COMPOSITIONS HAVING UNIQUE PERCOLATION BEHAVIOR, AND ELECTROSTATIC IMAGE DEVELOPING SYSTEMS AND COMPONENTS THEREOF INCORPORATING SAME

This application is a national phase application under 35 U.S.C. §371 of International Application Number PCT/US2012/047500, filed on Jul. 20, 2012, which claims priority to U.S. Provisional Patent Application No. 61/510,737, filed on Jul. 22, 2011.

FIELD OF THE INVENTION

Disclosed herein are high resistivity composites, compositions, and coatings having unique percolation behavior, as well as electrostatic image developing systems and components incorporate the same.

BACKGROUND

Electrophotographic systems and processes are known, including those described in U.S. Pat. Nos. 2,297,691; 3,666,363; 4,071,361, 5,489,498, 5,744,276, 5,942,366, and 6,002,895, the disclosures of which are incorporated herein by reference. In these systems and processes, in general, a photosensitive member, such as a photosensitive drum, is rotated through contact with a charging roller. An electrostatic latent image is formed on a photosensitive member comprising a photoconductive material, which image is then developed with a toner. The resultant toner image is transferred onto a transfer medium, such as paper, that is conveyed between the photosensitive member and an opposing transfer roller or belt. The toner image is then fixed on the transfer medium, such as by heating, pressing, or heating and pressing or with solvent vapor to obtain an imaged copy. Residual toner on the photosensitive member that has not been transferred is cleaned by various methods. The above steps may be repeated.

Components of these electrophotographic systems, such as the charging roller and transfer roller or belt and so forth, have been constructed with a central mandrel, in which a conductive elastic layer is formed at the outer periphery of the mandrel, such as described, for example, in U.S. Pat. No. 6,002,895, the disclosure of which is incorporated herein by reference. The electrical properties of the surface regions of these rollers can impact the performance and productivity of the systems using these components.

Accordingly, there remains a need for highly resistive coatings for electrophotographic systems having desired surface electrical properties, such as resistivity.

SUMMARY

Disclosed herein is one embodiment of a resistive composite comprising:
at least one resin;
at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:

the resistive composite has a volume resistivity, $R_v$, at a relative volume fraction, $X_{CB}$, of the at least one carbon black in the coating, where $R_v$ is at least $10^6$ ohm-cm; and log Rv has a substantially linear relationship with $X_{CB}$ when $X_{CB}$ is varied from 0.1 to 0.5.

In one embodiment, the substantially linear relationship has a goodness of fit value ($R^2$) of at least 0.8, e.g., a goodness of fit value ($R^2$) of at least 0.9.

In one embodiment, log $R_v$ has a substantially linear relationship with $X_{CB}$ when $X_{CB}$ is varied from 0.1 to 0.6.

In one embodiment, the substantially linear relationship is defined as log $R_v$ being directly proportional to $-m.X_{CB}$, wherein m is greater than 0 and no more than 15.

In one embodiment, the resistive composite a surface resistivity, $R_s$, of at least $10^6$ ohm/square, e.g., at least $10^7$ ohm/square, ranging from $10^6$ to $10^{12}$ ohm/square, or ranging from $10^7$ to $10^{11}$ ohm/square.

In one embodiment, the composite maintains a surface resistivity of at least $10^6$ ohm/square, e.g., at least $10^7$ or at least $10^8$ ohm/square, over an entire range of $X_{CB}$ values ranging from 0.1 to 0.5 or even over a range from 0.1 to 0.6.

In one embodiment, the at least one organic group has a molecular weight of 2000 or less. In one embodiment, G comprises at least one group selected from alkyls, carboxylic acid esters, amides, alcoxyls, ethers, ketones, acyls, and halides, e.g., G comprises fluorine. In another embodiment, —X(G)- is a monomer and the at least one organic group comprises an oligomer, e.g., the at least one organic group comprises the formula —[X(G)]$_n$- and n ranges from 1 to 20. In yet another embodiment the at least one carbon black is further modified with adsorbed oligomers derived from the —X(G)-monomers.

In one embodiment, the at least one resin is selected from acrylics, urethanes, epoxies, polyimides, polyesters, and blends and copolymers thereof. Acrylics can be selected from styrene-acrylics.

Other embodiments are directed to a substrate coated with the resistive composites disclosed herein. In one embodiment, the substrate is selected from a charge roller of an electrostatic image forming apparatus, a transfer roller or belt of an electrostatic image forming apparatus, and a developer-carrying roller for carrying a developer layer thereon positioned in a toner cartridge.

Another embodiment is directed to an electrostatic image forming apparatus comprising:
an electrostatic image-bearing member; and
at least one of:
  a charge roller;
  a transfer roller or belt; and
  a developer-carrying roller for carrying a developer layer thereon positioned in a toner cartridge,
wherein the at least one of the charge roller, the transfer roll or belt, and the developer-carrying roller has an outer layer comprising the resistive composites disclosed herein, e.g., comprising at least one resin; at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:

the resistive composite has a volume resistivity, $R_v$, at a relative volume fraction, $X_{CB}$, of the at least one carbon black in the coating, where $R_v$ is at least $10^6$ ohm-cm; and log Rv has a substantially linear relationship with $X_{CB}$ when $X_{CB}$ is varied from 0.1 to 0.5.

Another embodiment is directed to a method of making a coated substrate, comprising:

applying a composition onto a substrate, the composition comprising:

at least one resin;

at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic; and sufficient vehicle to disperse the carbon black, and curing the composition to form the coated substrate wherein:

the resistive composite has a surface resistivity, $R_s$, at a relative volume fraction, $X_{CB}$, of the at least one carbon black in the coating, where $R_s$ is at least $10^6$ ohm/square; and log $R_s$ has a substantially linear relationship with $X_{CB}$ when $X_{CB}$ is varied from 0.1 to 0.5.

In one embodiment, the at least one resin is curable and is selected from acrylics, urethanes, epoxies, polyimides, polyesters, and blends and copolymers thereof.

In one embodiment, the curing comprises irradiating the composition with actinic radiation. In another embodiment, the curing comprises air drying the composition or heating the composition. In one embodiment, the vehicle is a liquid organic vehicle.

Another embodiment is directed to a resistive composite comprising:

at least one resin;

at least one carbon black having a surface hydrophobically modified with at least one organic group, the at least one organic group having a molecular weight of 4000 or less and comprising the formula —[X(G)]$_n$-, wherein X is directly attached to the at least one carbon black and is selected from arylene, heteroarylene, and alkylene, G is a substituent of X, and —X(G)- is nonionic, and n ranges from 1 to 20.

In one embodiment, the resistive composite has a volume resistivity, $R_v$, at a relative volume fraction, $X_{CB}$, of the at least one carbon black in the coating, where $R_v$ is at least $10^6$ ohm-cm, and log $R_v$ has a substantially linear relationship with $X_{CB}$ when $X_{CB}$ is varied from 0.1 to 0.5. In another embodiment, the composite has a surface resistivity, $R_s$, of at least $10^6$ ohm/square. G can comprise at least one group selected from alkyls, carboxylic acid esters, amides, alcoxyls, ethers, ketones, acyls, and halides. In one embodiment, G is fluorine.

BRIEF DESCRIPTION OF THE DRAWING(S)

Figure 5A:
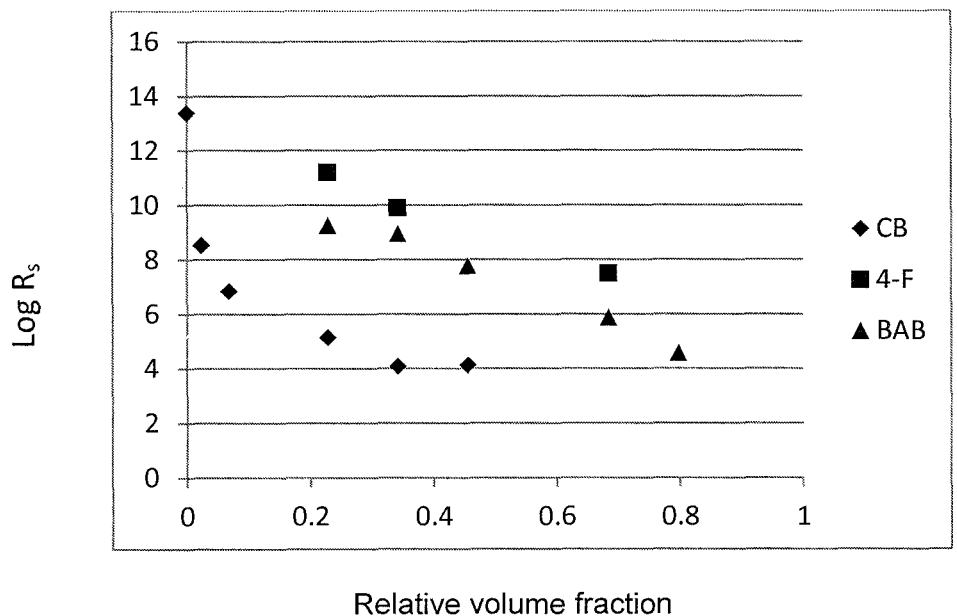
FIG. 5A is a plot of surface resistivity ($R_s$) on the log scale versus relative volume fraction (X) of carbon black for polyurethane composites containing unmodified carbon black, "CB-unmodified" (♦), and the hydrophobically modified carbon blacks "BAB-modified" (▲) and "4-F-modified" (■)
Figure 5B:
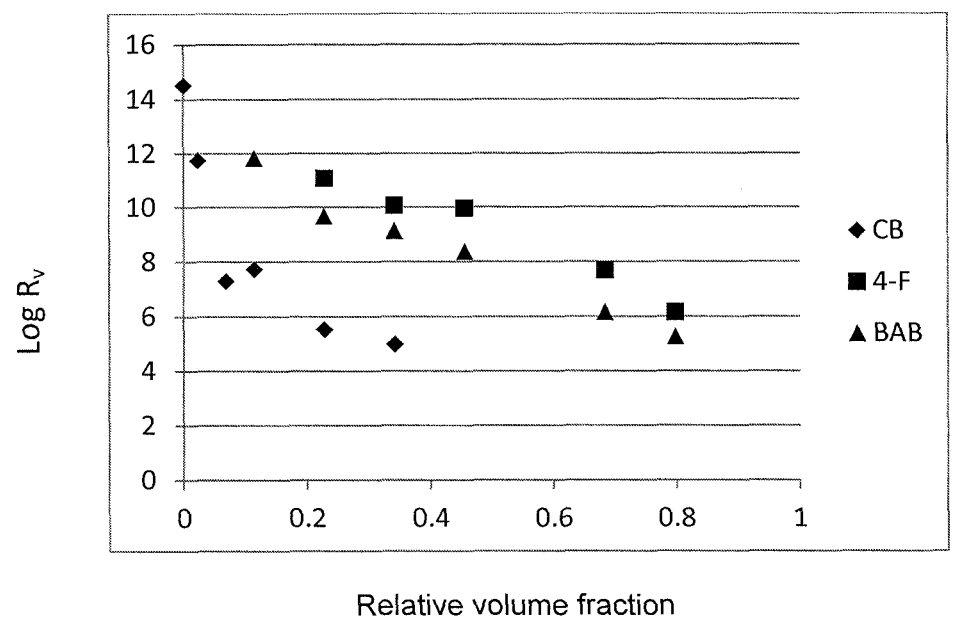
Figure 6A:
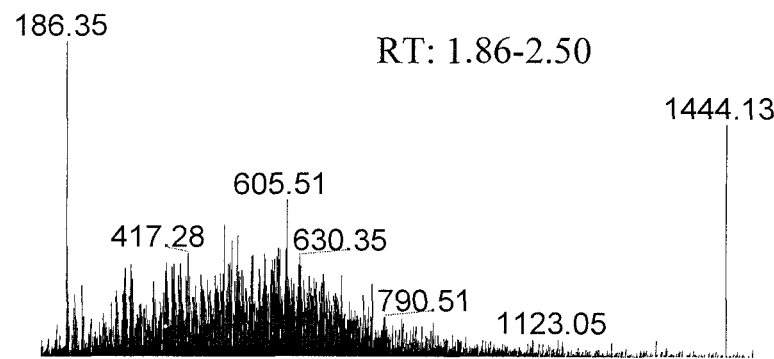
Figure 6B:
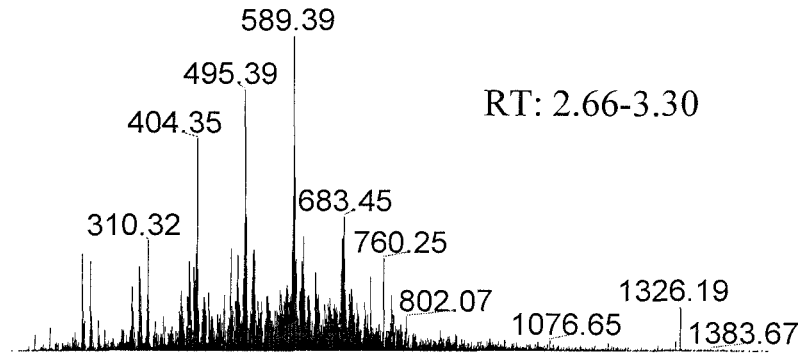
Figure 6C:
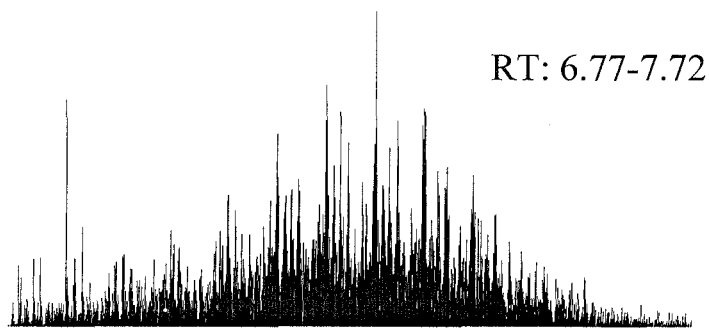

FIG. 5B is a plot of volume resistivity ($R_v$) on the log scale versus relative volume fraction (X) of carbon black for polyurethane composites containing unmodified carbon black, "CB-unmodified" (♦), and the hydrophobically modified carbon blacks "BAB-modified" (▲) and "4-F-modified" (■); and FIGS. 6A-6C are mass-spectra of the MEK extract 4-FA modified composite, featuring the 1.9, 2.4, and ~7 min retention time regions, respectively.

DETAILED DESCRIPTION

Disclosed herein are, generally, carbon black/polymer resistive composites and respective coatings made therefrom, with applications as coatings for electrophotographic machine components.

Carbon black products, including surface modified carbon blacks, have been disclosed for use in a variety of applications, including, for example, plastic compositions, inks, coatings, rubber compositions, paper compositions, textile compositions, and coating compositions such as color coatings and automotive topcoats, such as described, for example, in U.S. Pat. Nos. 6,740,151 B2, 6,645,287 B2, 5,713,988, 5,698,016, 5,900,029, the disclosures of which are incorporated herein by reference.

Carbon black can also provide certain electrical properties, and rendering them useful in polymeric-based components having certain resistivity requirements. For example, the loading level of a specific carbon black affects the volume resistivity of a polymer composite, where volume resistivity is an inherent measure of a material. At low carbon black concentrations, the total resistivity is effectively the same as the resistance of the polymer because the carbon black contribution is negligible. As the carbon black loading increases, the contact resistance of the carbon black begins to contribute to the overall resistivity of the composite. At a certain critical carbon black concentration, carbon black dominates the resistivity behavior by causing the resistivity to drop sharply. This phenomenon is known as "percolation," where the total resistivity is often attributed to (a) the contact resistance of individual carbon black dispersion particles or aggregates, and (b) tunneling resistance of spacing between the carbon black particles or aggregates in the polymer.

Figure 1:
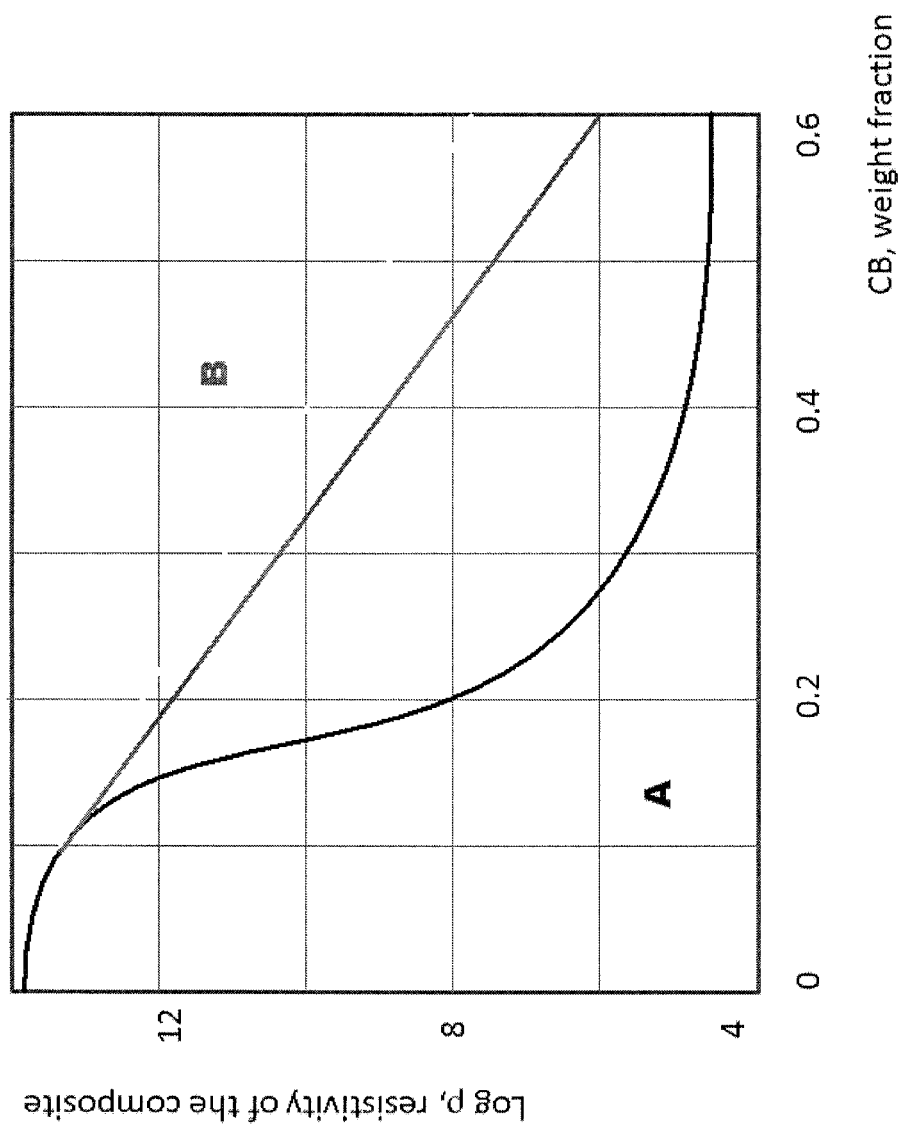
FIG. 1 are representative graphs of log p (volume or surface resistivity, y-axis) versus weight fraction of a composite comprising unmodified carbon black (CB) (plot A), and a composite according to the embodiments disclosed herein (plot B)

FIG. 1 shows two representative percolation curves of resistivity (log ρ, volume or surface) versus carbon black content for two types of carbon black/polymer composites, in which each composite comprises the same resin but a different type of carbon black. In FIG. 1, the percolation curve for an unmodified carbon black/polymer composite (curve "A") approaches the form of a step function: with a high starting resistivity, ρ, (approximately $10^{14}$ to $10^{16}$ ohm-cm for volume resistivity or approximately $10^{13}$ to $10^{15}$ ohm/square for surface resistivity) at low or negligible carbon concentration, the percolation phenomenon described above occurs at a certain carbon loading threshold value where the curve follows a sudden resistivity drop ("percolation") to values of about $10^2$ to $10^4$ ohm-cm for volume resistivity. Past this threshold, higher carbon loading levels have very little effect on the composite resistivity. Conventional composites, which follow the behavior of the "A" curve, present difficulties in applications have constrained resistivity requirements, e.g., a volume resistivity in the $10^6$ to $10^{13}$ ohm-cm range. Target resistivities in this range are highly sensitive to carbon concentration where any small deviation in carbon loading can significantly alter the composite resistivity. Such sensitivity leaves coating manufacturers with little leeway in modifying the carbon content to meet the other requirements for the composite, e.g., conformability, machinability, etc., potentially limiting the usefulness of carbon black-polymer coatings in applications demanding more predictable and controlled resistivity behavior over a lower and/or broader range of carbon loading levels.

Disclosed herein is the discovery that certain surface modifications of carbon black alter the resistivity performance from conventional percolation phenomenon, as illustrated by curve "B" in FIG. 1. Curve B follows a more "flattened" or linear transition from resistivity to conductivity on the log scale. The sharp percolation drop of prior art composites is effectively nonexistent in the present composites, where the resistivity exhibits a gradual decrease with carbon content over a broad range of carbon loading levels. This flattened behavior can be useful for applications that require an "intermediate" resistivity (e.g., a volume resistivity of at least $10^6$ ohm-cm, such as from $10^6$ to $10^{13}$ ohm-cm). For the composites disclosed herein, a target resistivity can be achieved over a wide range of carbon black loading values as resistivity is not overly sensitive to carbon content, which is desirable for large scale manufacturing.

Figure 2:
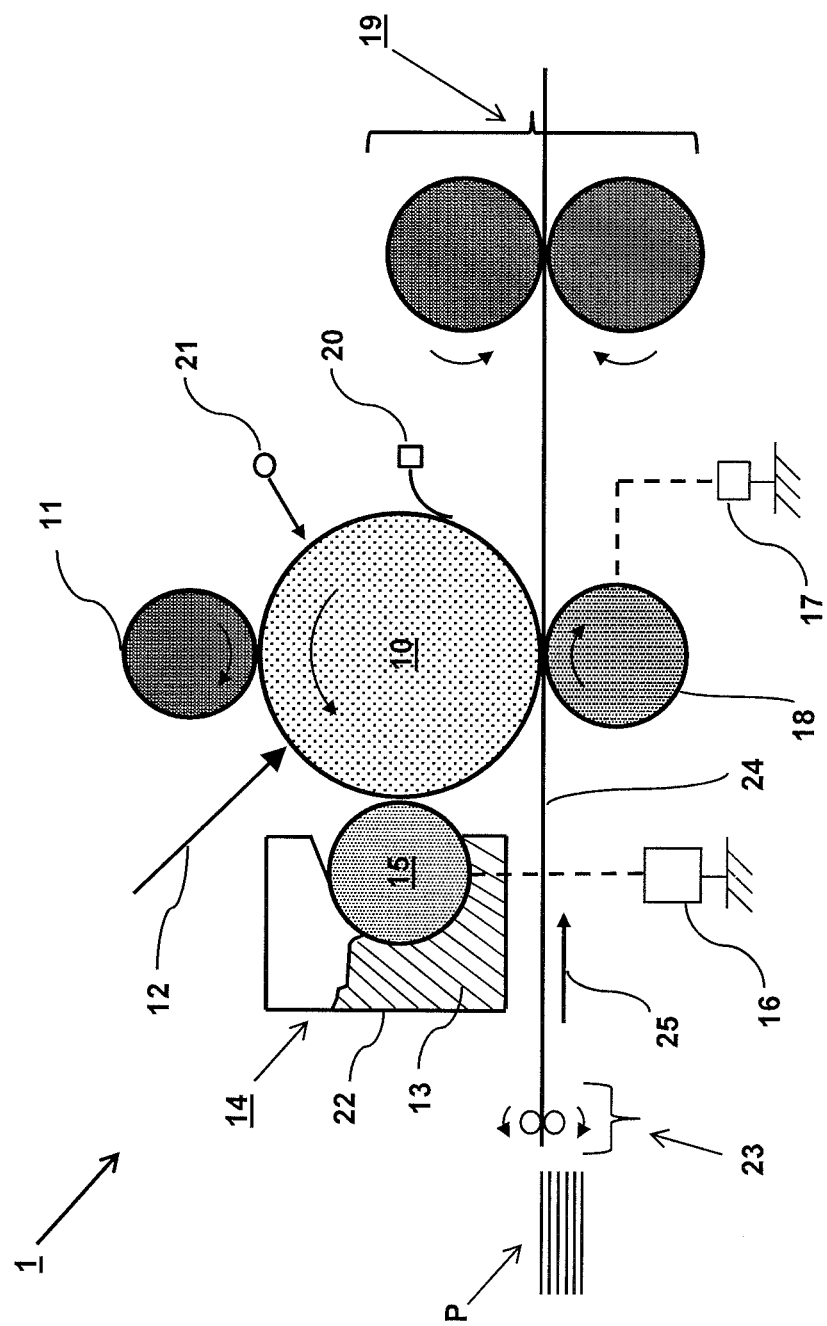
FIG. 2 is a schematic illustration of an electrophotographic apparatus including at least one roller component coated with a highly resistive coating, according to the embodiments disclosed herein.

The ability to achieve target resistivities over a broad range of carbon loading has applications in, e.g., office automation (O/A) rollers such as electrophotographic ("EP") image machines, which are components for printers and copiers, among other office machines. These rollers often have specified electrical performance properties to enable functions such as electrical charging, toner transfer, and development. An example of a machine incorporating such rollers is shown in FIG. 2, illustrating an electrophotographic machine 1 having subsystems relating to (1) charging, (2) exposure, (3) development, (4) toner transfer, (5) toner fusing, and (5) cleaning Although not limited thereto, electrophotographic machine 1 of FIG. 2 may represent a black and white photocopier, a color photocopier, a laser printer, and other EP devices or machines capable of transferring an image from a photoconductor to paper. Machine 1 of FIG. 2 includes a photosensitive drum 10 or other electrostatic image bearing member comprising a conductive substrate layer made of aluminum or the like and a photoconductive layer formed on its periphery. During the initial charging step, drum 10 is rotated (counterclockwise for illustrative purposes, as indicated by the arrow), while in pressure contact with primary contact charging means 11, which may be a charging roller as shown, or a charging brush or a charging blade. Applying a bias to the charging roller 11 charges the surface of the photosensitive drum 10 to a given polarity and potential.

Exposure is then carried out by exposing the charged photosensitive drum 10 to a light beam having a direction indicated by arrow 12, such as a laser beam or analog light beam, forming a digital electrostatic latent image by image scanning Subsequently, in the developing zone, the electrostatic latent image is reverse developed via a toner cartridge assembly 14, comprising toner storage chamber 22 that houses toner 13, such as a magnetic toner, having negative triboelectric charges, and a developing roller 15, which is removably detachable. A conductive substrate of the photosensitive drum 10 is grounded and an AC bias, a pulse bias and/or a DC bias is/are applied to the developing roll 15 through a bias applying member 16 to allow deposition of toner particles onto drum 10.

During toner transfer, a transfer medium P, such as a sheet of paper, is fed and delivered via rollers 23 (rotating in respective directions as indicated by the arrows) and conveying member 24 to the transfer zone in a direction indicated by arrow 25, where the transfer medium P is electrostatically charged by a voltage applying device 17 through a transfer roller 18. The transfer roller 18 is brought into pressure contact with the surface of the photosensitive drum 10 and the developed toner image is electrostatically transferred from the surface of drum 10 to the transfer medium P. Transfer roller 18 may alternatively be a transfer belt, e.g., in a color machine.

The transfer medium P containing the toner image is subjected to fusing or fixing using a heat-pressure roller fixing assembly 19. Any toner remaining on the photosensitive drum 10 after the transfer step is removed by the operation of a cleaning blade 20 or other cleaning means. The cleaning step may be optional if little reside of magnetic toner remains on the drum. After the cleaning, the residual charge on the surface of the photosensitive drum 10 is eliminated by erasure exposure 21. The entire procedure can be repeated for subsequent images.

In this non-limiting illustration, any one or more of the charging roller 11, developing roller 15, and transfer roller or belt 18 can be provided with the resistive coating having unique percolation behavior in accordance with various embodiments described herein. Other features and operational conditions of the electrophotographic machine 1 can include those components described in U.S. Pat. No. 6,002,895, the disclosure of which components is incorporated herein by reference.

It has been discovered that certain surface modifications can achieve carbon black/polymer composites exhibiting a flattened or linear resistivity over a wide range of carbon loading values. Such composites can have application in the O/A rollers or EP machine components discussed above. Accordingly, one embodiment provides a resistive composite, comprising:
  at least one resin;
  at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:

the resistive composite has a volume resistivity, $R_v$, at a relative volume fraction, $X_{CB}$, of the at least one carbon black in the coating, where $R_v$ is at least $10^6$ ohm-cm; and log $R_v$ has a substantially linear relationship with $X_{CB}$ when $X_{CB}$ is varied from 0.1 to 0.5.

Resistivity can be measured using a variety of techniques known in the art including, for example, the method defined in ASTM Procedure D257-93. Unless indicated otherwise, all resistivity values described herein are volume resistivity values. Surface resistivity values can also be obtained by methods known in the art.

In one embodiment, the substantially linear relationship is manifested as $X_{CB}$ being directly proportional to resistivity on the log scale. In certain embodiments, the substantially linear relationship is maintained when $X_{CB}$ is varied from 0.1 to 0.6. In one embodiment, the linear relationship between log $R_v$ and $X_{CB}$ takes the form of log $R_v$ being directly proportional to -m.$X_{CB}$ when $X_{CB}$ is varied from 0.1 to 0.5, or from 0.1 to 0.6. In a plot of log $R_v$ and $X_{CB}$ log $R_v$ decreases as $X_{CB}$ increases with the data points fitting a line having a negative slope, i.e., -m. A low value of m would indicate a flattened resistivity response to carbon loading, effectively delaying the onset of conduction via formation of a conductive network of carbon black particles. In one embodiment, m is greater than 0 and no more than 15. In some embodiments, m is greater than 0 and no more than 10. In other embodiments, m ranges from 5-15 or from 5-10.

In one embodiment, "substantially linear" refers to linearity that complies with a certain goodness of fit value, $R^2$. In one embodiment, $R^2$ is at least 0.8. In another embodiment $R^2$ is at least 0.85, at least 0.9, or even as high as 0.95. The value of m and the corresponding intercepts can depend on several factors, e.g., the nature of the organic group, the structure of the modified carbon black, the resin chemistry, among other factors.

The relative volume fraction of carbon black, $X_{CB}$ is one measure of carbon content, with a scale ranging from 0 to 1, and can be calculated from, e.g., volume fraction values of CB in composite and CB structure, expressed in DBP value, as indicated by the following equation:

$$X_{CB} = \Phi/\Phi_{max}$$

where $\Phi_{max} = (100/\rho_{CB})/((100/\rho_{CB}) + DBP))$

The maximum volume fraction $\Phi_{max}$ is a volume fraction of carbon black at DBP (in cc/100 g carbon black), which is a condition of maximum packing of carbon black particles in a fixed volume.

In one embodiment, the resistive composite has the disclosed resistivity properties over a range of $X_{CB}$ values, e.g., from 0.1 to 0.5, or even ranging from 0.1 to 0.6. While any given composite will have a single $X_{CB}$ value, its relationship with resistivity can be determined by varying the $X_{CB}$ value (e.g., by reducing or increasing the carbon black concentration with respect to the amount of resin) and measuring the resistivities of a series of such composites made from the initial composite.

In one embodiment, the resistive composite has an $X_{CB}$ ranging from 0.1 to 0.6, such an $X_{CB}$ ranging from 0.1 to 0.5. Other metrics for assessing the modified carbon black concentration of the resistive composite are known, such as by weight fractions (e.g., % w/w), volume fractions, or as ratios of the at least one carbon to the at least one resin, e.g., pigment to binder (P/B) ratios. In one embodiment, the composite has a modified carbon black concentration ranging from 5 to 30% w/w, e.g., from 10 to 30% w/w, from 5 to 20% w/w, or from 10 to 30% w/w. In another embodiment, the composite has a modified carbon black volume fraction ranging from 2 to 15% v/v. In another embodiment, the composite as a P/B ratio ranging from 0.1 to 0.45, e.g., from 0.1 to 0.3.

In one embodiment, the composite has a volume resistivity of at least $10^6$ ohm-cm, such as a resistivity of at least $10^8$ ohm-cm. In another embodiment, the composite has a volume resistivity ranging from $10^6$ to $10^{15}$ ohm-cm, e.g., from $10^8$ to $10^{15}$ ohm-cm, from $10^6$ to $10^{13}$ ohm-cm, from $10^8$ to $10^{15}$ ohm-cm, from $10^6$ to $10^{12}$ ohm-cm, or from $10^8$ to $10^{12}$ ohm-cm. In one embodiment, the composite maintains a volume resistivity of at least $10^6$ ohm-cm, e.g., at least $10^8$ ohm-cm, over an entire range of $X_{CB}$ values ranging from 0.1 to 0.5 or even over a range from 0.1 to 0.6. In one embodiment, the composite maintains a volume resistivity from $10^6$ to $10^{15}$ ohm-cm, e.g., from $10^8$ to $10^{15}$ ohm-cm, over a range of $X_{CB}$ values ranging from 0.1 to 0.5 or even over the range from 0.1 to 0.6. In another embodiment, the composite maintains a resistivity from $10^6$ to $10^{12}$ ohm-cm, e.g., from $10^8$ to $10^{12}$ ohm-cm, over a range of $X_{CB}$ values ranging from 0.1 to 0.5 or even over the range from 0.1 to 0.6.

In one embodiment, the composite has a surface resistivity of at least $10^6$ ohm/square, such as a resistivity of at least $10^7$ or at least $10^8$ ohm/square. In another embodiment, the composite has a resistivity ranging from $10^6$ to $10^{14}$ ohm/square, e.g., from $10^7$ to $10^{14}$ ohm/square, from $10^6$ to $10^{12}$ ohm/square, from $10^7$ to $10^{14}$ ohm/square, from $10^7$ to $10^{12}$ ohm/square, or from $10^7$ to $10^{11}$ ohm/square. In one embodiment, the composite maintains a surface resistivity of at least $10^6$ ohm/square, e.g., at least $10^7$ or at least $10^8$ ohm/square, over an entire range of $X_{CB}$ values ranging from 0.1 to 0.5 or even over a range from 0.1 to 0.6. In one embodiment, the composite maintains a resistivity from $10^6$ to $10^{14}$ ohm/square, e.g., from $10^7$ to $10^{14}$ ohm/square, over a range of $X_{CB}$ values ranging from 0.1 to 0.5 or even over the range from 0.1 to 0.6. In another embodiment, the composite $10^7$ to $10^{11}$ ohm/square, over a range of $X_{CB}$ values ranging from 0.1 to 0.5 or even over the range from 0.1 to 0.6.

It has been discovered that the desired resistivity behavior can be achieved with certain surface modifications of carbon black. In one embodiment, the at least one carbon black has a surface hydrophobically modified with at least one organic group, e.g., the at least one organic group is hydrophobic. In one embodiment, the hydrophobicity results from the at least one organic group being nonionic. In another embodiment, the hydrophobicity results from the at least one organic group being nonionic and nonionizable, e.g., the at least one organic group is not easily converted or hydrolyzed in solution to an ionic or ionizable group. It had been previously found that when the at least one organic group is ionic or ionizable, the percolation phenomenon is still observed, although U.S. Pub. No. 2006/0084751 has disclosed composites that shift and, thus, delay the percolation threshold to higher carbon loading values. Without wishing to be bound by any theory, hydrophobic and nonionic modified carbon blacks are less likely to participate in hydrogen bonding mechanisms that may have otherwise contributed to a conductive network. In one embodiment, by reducing or eliminating the hydrogen bonding capability, such hydrophobic modifications can flatten or erase percolation behavior.

In one embodiment, the at least one organic group comprises —X(G)-, which is nonionic, wherein X is directly attached to the at least one carbon black and G is a substituent of X. In one embodiment, X is chemically attached, e.g., covalently attached, to the carbon black surface to provide a more stable attachment of the groups onto the carbon black compared to adsorbed groups. In this embodiment, adsorbed compounds containing —X(G)-groups may also be present and may contribute to the electrical properties of the composite so long as the carbon black surface also includes attached —X(G)-groups. Methods for covalent or chemical attachment are described in more detail below. In one embodiment, X is selected from arylene, heteroarylene, and alkylene. Exemplary arylenes include phenylene, naphthylene, and biphenylene, and exemplary heteroarylenes include phenylene, naphthylene, and biphenylene having a ring carbon substituted with one or more oxygen or nitrogen atoms. When X is an alkylene, examples include substituted or unsubstituted alkylenes that may be branched or unbranched. For example, the alkylene may be a $C_1$-$C_{12}$ alkylene such as methylene, ethylene, propylene, or butylene.

In one embodiment, G is a substituent of X and contributes to the hydrophobic and nonionic nature of the at least one organic group. X can contain one or more G substituents, depending on the structure of X. In one embodiment, G comprises at least one group selected from: alkyls and alkylenes, e.g., —R" where —R" is a branched or unbranched $C_1$-$C_{20}$ alkyl or alkylene; carboxylic acid esters, e.g., —COOR" or —OCOR"; amides, e.g., CONHR", —CONR"$_2$, —NHCOR", or —NR"COR"; alcoxyls, ethers, ketones, acyls, and halides. In certain embodiments, G comprises an electron-withdrawing group, e.g., a fluorine-containing group or fluorine itself. In other embodiments, G comprises a carboxylic acid ester.

In another embodiment, G comprises at least one group selected from $C_1$-$C_{20}$ alkyls and alkylenes, $C_2$-$C_{20}$ carboxylic acid esters, $C_2$-$C_{20}$ amides, $C_1$-$C_{20}$ alkoxy, $C_1$-$C_{20}$ ethers, $C_1$-$C_{20}$ ketones, $C_1$-$C_{20}$ acyls, and halides.

In one embodiment, —X(G)- has a molecular weight of less than 4000, such as a molecular weight of less than 3000 or a molecular weight of less than 2000. In one embodiment, the at least one carbon black is substituted with two or more different —X(G)-groups, resulting in a distribution of molecular weights, where the average MW is less than 4000, or less than 3000, or less than 2000.

In one embodiment, —X(G)- is a monomer and the at least one organic group is oligomeric. For example, the at least one organic group is —[X(G)]$_n$- and n ranges from 1 to 20. Another embodiment provides a resistive composite comprising:
 at least one resin; and
 at least one carbon black having a surface hydrophobically modified with at least one organic group, the at least one organic group having a molecular weight of 4000 or less and comprising the formula —[X(G)]$_n$-, wherein X is directly attached to the at least one carbon black and is selected from arylene, heteroarylene, and alkylene, G is a substituent of X, and —X(G)- is nonionic, and wherein n ranges from 1 to 20.

In one embodiment, the molecular weight is less than 3000 or a molecular weight of less than 2000. In another embodiment, the molecular weight of the oligomer is a weight average molecular weight of less than 4000, less than 3000 or less than 2000. In another embodiment, the value "n" is a mean value ranging from 1 to 20.

Without wishing to be bound by any theory, an oligomer is formed during attachment of an organic monomer to the carbon black via a diazonium ion intermediate, in which reduction of the diazonium ion by the carbon black produces a radical species capable of propagation for radical oligomerization. In one embodiment, the propagation involves initial attachment to the carbon black surface of radical intermediates comprising the at least one organic group. In one embodiment, X is an arylene and G has sufficient electronic properties to stabilize an aryl radical that may be formed during the attachment of the at least one organic group via the diazonium ion intermediate. In one embodiment, G is sufficiently electron-withdrawing to stabilize an aryl radical.

In one embodiment the diazonium salt attachment is performed in the presence of a "poor solvent," e.g., one that does not solubilize the reactants and/or reaction products. (See, e.g., Guo et al., *Macromolecules*, 39:9035-9040, 2006). In one embodiment, the poor solvent is water or an aqueous solution. Without wising to be bound by any theory, a poor solvent can result in adsorption of the hydrophobic reactants on the carbon black surface. When diazonium salt is reduced by an electron from the carbon black surface to form a radical species, the presence of a high local concentration of the hydrophobic reactants residing along the carbon black surface results in a competition between radical insertion into the carbon black surface (attachment) and radical propagation with other species, the latter of which would result in oligomerization.

In one embodiment, in addition to organic groups attached to the carbon black surface, the composite further comprises adsorbed oligomers comprising —X(G)-monomers, including any —X(G)-groups disclosed herein. Without wishing to be bound by any theory, the radical reactions discussed above can involve reactants that are not attached to the carbon black surface. Moreover, the adsorbed oligomers can contribute to the electronic/resistivity properties of the modified carbon black.

Further, without wishing to be bound by any theory, the oligomeric nature of the at least on organic group in certain embodiments can contribute to the high resistivity of the composite even with higher carbon black content. In addition to their hydrophobicity (which reduces the likelihood of hydrogen bonding networks, as discussed above), the length and/or bulk of the oligomers can physically extend the distance between respective carbon black centers even at high carbon loading, thereby reducing the likelihood of electron tunneling In certain embodiments it has been discovered that maintaining a low volatile content in the resistive composite or carbon blacks factor into maintaining high resistivities. In one embodiment, the modified at least one carbon black has a volatile content of less than 3%, e.g., from 0.5% to 3% or from 1.0% to 3.0%.

These composites can be useful as coatings for substrates. Accordingly, one embodiment provides a substrate coated with a resistive composite comprising:
 at least one resin;
 at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:
 the resistive composite has a surface resistivity, $R_s$, at a relative volume fraction, $X_{CB}$, of the at least one carbon black in the coating, where $R_s$ is at least $10^6$ ohm/square; and log $R_s$ has a substantially linear relationship with $X_{CB}$ when $X_{CB}$ is varied from 0.1 to 0.5.

In one embodiment embodiment, O/A or EP roller/belt components can act as substrates provided with carbon black-polymer composite coatings exhibiting the "flattened" percolation behavior. By applying the disclosed composites as an outer layer, EP equipment manufacturers and other original equipment manufacturers can have greater flexibility in formulating coatings over a broader range of carbon black loading levels without significantly altering the resistivity behavior. The roller coating is more tolerant of changes made in carbon loading in the coating formulation, and can stay within a target resistivity as the carbon content is adjusted over a broad range of values including lower carbon loading levels, such as those below 30 wt % carbon.

Additionally, many O/A rollers are brought into significant compression against other parts during normal use, which can effectively change the volume loading of the roller coating. For example, in conventional EP devices, this change in volume loading can affect the resistivity properties, rendering it more difficult to maintaining the target resistivity as precipitous percolation behavior may result. Consequently, there is a need for a roller coating that maintains the desired resistivity behavior even when subjected to such compression. In certain embodiments, the disclosed composites can provide a resistive coating that meets this criterion. Coatings of various aspects of the present teachings are also useful as roller coatings in EP machines for purposes of beneficially adjusting relaxation time and controlling current flow, and other electrical properties of the roller, in a useful manner.

In one embodiment, the substrate comprises at least one of:
  a charge roller;
  a transfer roller or belt; and
  a developer-carrying roller for carrying a developer layer thereon positioned in a toner cartridge.

In one embodiment, the at least one of the charge roller, the transfer roll or belt, and the developer-carrying roller has an outer layer comprising any one of the resistive composites disclosed herein.

Another embodiment provides an electrostatic image forming apparatus comprising:
  an electrostatic image-bearing member; and
  at least one of:
    a charge roller;
    a transfer roller or belt; and
    a developer-carrying roller for carrying a developer layer thereon positioned in a toner cartridge,
  wherein the at least one of the charge roller, the transfer roll or belt, and the developer-carrying roller has an outer layer comprising a resistive composite comprising:
    at least one resin;
    at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:
      the resistive composite has a surface resistivity, $R_s$, at a relative volume fraction, $X_{CB}$, of the at least one carbon black in the coating, where $R_s$ is at least $10^6$ ohm/square; and log $R_s$ has a substantially linear relationship with $X_{CB}$ when $X_{CB}$ is varied from 0.1 to 0.5.

Figure 3:
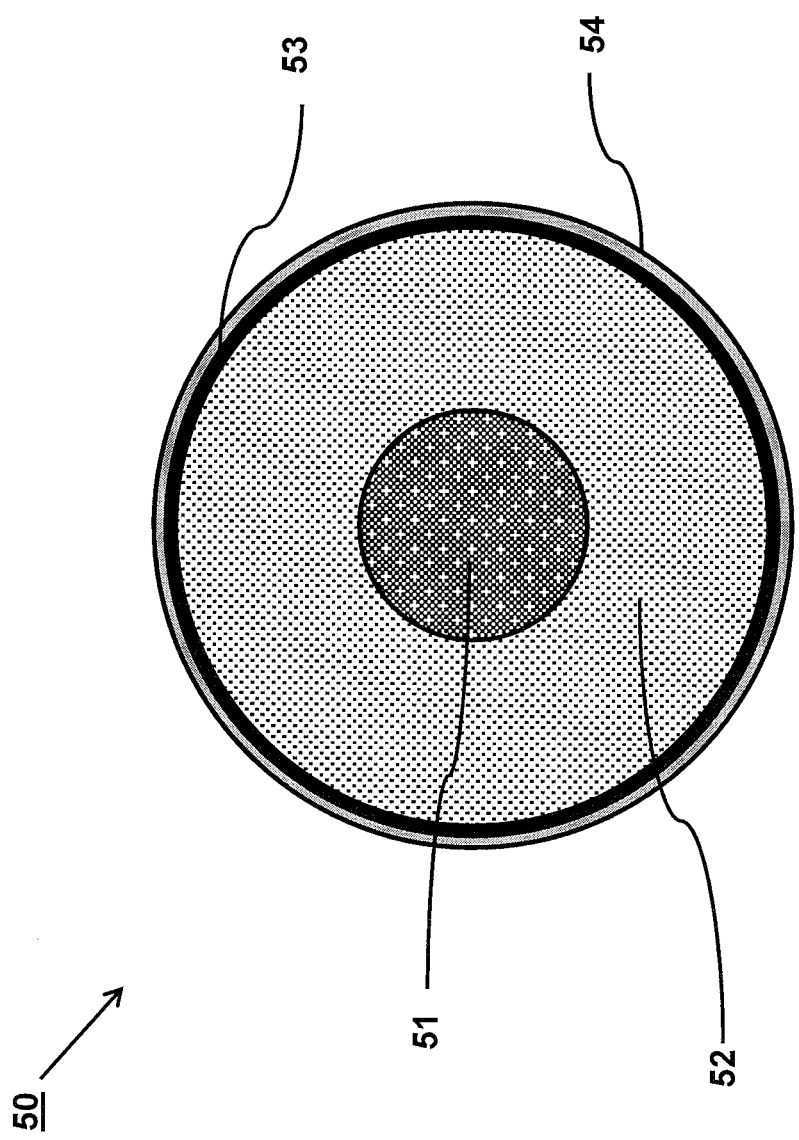
FIG. 3 is a cross-sectional view of a roller for electrophotographic machines coated with a resistive coating, according to the embodiments disclosed herein.

FIG. 3 is a cross-sectional illustration of a roller 50, which can represent any one of rollers 11, 15 or 18, for machine 1 of FIG. 2 that requires a highly resistive coating. In FIG. 3, roller 50 has a centrally located mandrel 51, which in this non-limiting illustration, is a steel shaft, and which may be 10 mm diameter for purposes of this embodiment but may be altered as known in the art. A conductive elastic layer 52 is formed around the periphery of shaft 51, which may be about 2.5 mm thick for purposes of this embodiment. The conductive elastic layer 52 may be made of an elastic material having a volume resistivity of $10^6$ to $10^{13}$ ohm-cm, e.g., polyurethane with a conductive material such as carbon dispersed therein, or an ethylene-propylene-diene type terpolymer (EPDM). A relatively thinner yet highly resistive layer/coating 53 is applied over conductive layer 52, where layer 53 can comprise any of the disclosed composites according to various embodiments disclosed herein. Layer 53 can supersede and/or aid in controlling any otherwise undesirable percolation tendencies of the inner layer 52.

In one embodiment, coating/layer 53 has a generally linear relationship of log resistivity and carbon content properties, where the surface resistivity is at least $10^6$ ohm/square, at least $10^7$ ohm/square, or even at least $10^8$ ohm/square during operation of the roller for a relative volume fraction of the at least one carbon black. In one embodiment, coating/layer 53 has a surface resistivity ranging from $10^6$ to $10^{12}$ ohm/square, e.g., from $10^6$ to $10^{11}$ ohm/square, from $10^7$ to $10^{12}$ ohm/square, from $10^7$ to $10^{12}$ ohm/square, or from $10^7$ to $10^{11}$ ohm/square at a relative volume fraction of the modified at least one carbon black when varied ranging from 0.1 to 0.5, or from 0.1 to 0.6. The resistive coating 53 is less sensitive to carbon content and thus more tolerant of adjustments in this parameter, such that the coating does not exhibit a sudden drop in resistivity property for any small change in carbon content of the coating formulation or the effects of roller compression incurred during operation.

The thickness of resistive coating 53 may vary depending on the type and scale of the application. In one embodiment, the thickness of the resistive coating ranges from 0.01 to 15 mm, e.g., from 0.1 to 10 mm, from 0.1 to 5 mm, from 0.1 to 1 mm, or from 0.15 to 0.25 mm. In various embodiments, the resistive coating 53 generally is used in a thickness sufficient to adjust relaxation time and control current flow in roll 50.

In one embodiment, the resistive coating, as disclosed herein (e.g., layer/coating 53) can be applied to a substrate (e.g., periphery layer 52 or any roller/belt as disclosed herein) as a curable coating composition. In one embodiment, the composition can be cured in situ on the substrate. Accordingly, another embodiment provides a method of coating a substrate, comprising:
  applying a composition onto a substrate, the composition comprising:
    at least one resin;
    at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic; and
  sufficient vehicle to disperse the carbon black, and curing the composition to form the coated substrate wherein:

the resistive composite has a surface resistivity, $R_s$, at a relative volume fraction, $X_{CB}$, of the at least one carbon black in the coating, where $R_s$ is at least $10^6$ ohm/square; and log $R_s$ has a substantially linear relationship with $X_{CB}$ when $X_{CB}$ is varied from 0.1 to 0.5.

In one embodiment, the at least one resin is curable, thereby providing a curable composition. In one embodiment, the curable composition comprises the at least one curable resin, the at least one carbon black as disclosed herein, and at least one liquid vehicle, the latter described in further detail below.

The curable composition may be formed using any method known to those skilled in the art, including, for example, using high shear mixing. In various embodiments, the compositions are prepared using a dispersion of the modified carbon black, such as a millbase. The amount of modified carbon black can range from 1% to 60% based on the total dry weight of dispersion, e.g., from 5% to 30% by weight.

In one embodiment, the at least one resin can be cured by one or more of a variety of known methods, including, for example, thermally or by any source of radiation such as, for example, infrared or ultraviolet radiation, or even air drying. In one embodiment, the curable coating composition is photosensitive, e.g., may be cured by irradiation. When the resin is curable by irradiation, the curable coating composition may further comprise a photoinitiator, which generates a radical on absorbing light with the respective carbon black. In another embodiment, the curable coating composition is thermosensitive, e.g., may be cured by changing temperature, such as by heating. More than one resin can be used, such as 2, 3, 4, 5, or more.

The curable coating can be applied in any manner known in the art, such as spray coating, transfer coating, slot coating, casting, brushing, among other techniques. In various embodiments, the coating can be exposed to a source of actinic radiation to promote cure of the polymer resin and content thereof. Photoinitiators can be included in the curable coating composition to promote the cure process. The coating is also dried to drive off the organic liquid vehicle.

The curable coating composition can be formed with a minimum of additional components (additives and/or cosolvents) and processing steps. However, additives such as surfactants and cosolvents may also be included. Monomers and/or oligomers may also be added.

In one embodiment, a very thin outermost release coat 54 may be provided on the outermost surface of roller 50. The release coat may be formed, for example, of nylon resin, PVDF (polyvinylidene fluoride) or PVDC (polyvinylidene chloride), any of which can be used. Coating 54 can be coated to a thickness ranging from 0.1 to 4 microns or more. It protects the underlayers from wear and chemical breakdown, but is sufficiently thin so as not to significantly affect the electrical properties of roll 50.

In one embodiment, the at least on carbon black is dispersible in polar organic vehicles used to formulate the curable coatings. In one embodiment, a dispersion of carbon black with polymers (e.g., acrylic-based or polyurethane) in methyl ethyl ketone (MEK) is provided, such as from 0.5:10 to 1:20 carbon black to polymer (resin) ratio and total solids ranging from 15 to 30 wt %.

Additional details of the carbon blacks, resins, organic groups, and other features of the composite are described below.

Carbon Black

In one embodiment, the at least one carbon black can be any type conventionally used by those skilled in the art. Representative examples of carbon blacks include channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Mogul® E, Regal® 250, Regal® 250R, Regal® 350, Regal® 350R, Regal® 330, Regal® 400, Vulcan® P, Vulcan® XC-72, Vulcan® XC-72R). The at least one carbon black can also be used in combination with a variety of different types of dispersants in order to form stable dispersions.

In one embodiment, the at least one carbon black is a multiphase aggregate comprising a carbon phase and a silicon-containing species phase or a multiphase aggregate comprising a carbon phase and a metal-containing species phase. The multiphase aggregate containing the carbon phase and the silicon-containing species phase can also be considered a silicon-treated carbon black aggregate and the multiphase aggregate containing a carbon phase and a metal-containing species phase can be considered to be a metal-treated carbon black. It is would be understood by those skilled in the art that the multiphase aggregates do not represent a mixture of discrete carbon black aggregates and discrete silica or metal aggregates and are not silica coated carbon blacks. Rather, the multiphase aggregates that can be used as the at least one carbon black include at least one silicon-containing or metal-containing region concentrated at or near the surface of the aggregate and/or within the aggregate. The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase.

The metal-treated carbon blacks are aggregates containing at least a carbon phase and a metal-containing species phase. Exemplary metal-containing species include compounds containing aluminum, zinc, magnesium, calcium, titanium, vanadium, cobalt, nickel, zirconium, tin, antimony, chromium, neodymium, lead, tellurium, barium, cesium, iron, silver, copper, and molybdenum. The metal-containing species phase can be distributed through at least a portion of the aggregate and is an intrinsic part of the aggregate. The metal-treated carbon black may also contain more than one type of metal-containing species phase or the metal-treated carbon black can also contain a silicon-containing species phase and/or a boron-containing species phase.

The details of making these multiphase aggregates are disclosed in U.S. Pat. Nos. 5,830,930, 5,877,238, 5,948,835, U.S. application Ser. No. 08/750,017, filed Nov. 22, 1996, which is a National Phase Application of PCT No. WO 96/37547, and U.S. Pat. Nos. 6,017,980, 5,948,835, and 6,057,387, the disclosures of which are incorporated herein by reference.

A silica-coated carbon product can also be used as the at least one carbon black, such as that described in PCT Application No. WO 96/37547, published Nov. 28, 1996, which is hereby incorporated in its entirety herein by reference.

The at least one carbon black can have a wide range of BET surface areas, as measured by nitrogen adsorption, depending on the desired properties of the carbon black. For example, the at least one carbon black has a surface area ranging from 10 to 600 m$^2$/g, such as from 50 to 300 m$^2$/g. As known to those skilled in the art, a higher surface area will correspond to a smaller primary particle size. The at least one carbon black can also have a wide variety of primary particle sizes known in the art. For example, the primary particle size ranges from 5 nm to 100 nm, such as from 10 nm to 80 nm, or from 15 nm to 40 nm. If, for example, a higher surface area for is not readily available for the desired application, it is also well recognized by those skilled in the art that the at least one carbon black may be subjected to conventional size reduction or comminution techniques, such as ball or jet milling, to reduce the carbon black to a smaller particle size, if desired.

The at least one carbon black can also have a wide range of dibutylphthalate absorption (DBP) values, which is a measure of the structure or branching of the carbon black. For example, the DBP value can range from 25 to 400 mL/100 g, including from 30 to 300 mL/100 g, or from about 80 to 180 mL/100 g. The at least on carbon black may have a wide range of primary particle sizes, such as from 10 to 100 nm, e.g., from 15 to 30 nm. In one embodiment, the at least one carbon black has an essentially overall spherical geometry. In other embodiments, other shapes, such as needles and plates, may also be used.

In one embodiment, different carbon blacks may be used in the resistive composite, each carbon black comprising a different properties (e.g., two carbon black types each having different surface areas and/or structures) and having the same attached organic group (such as one comprising at least one carboxylic acid ether or fluorine-containing group) may be used together.

Organic Groups

A method that can be used to attach the at least one organic group to the carbon black can be a diazonium treatment as detailed, for instance, in the following patents: U.S. Pat. Nos. 6,852,158; 6,664,312; 6,551,393; 6,534,569; 6,372,820; 6,368,239; 6,350,519; 6,337,358; 6,103,380; 7,173,078; 7,056,962; 6,953,825; 6,942,724; 6,936,097; 6,929,889; 6,911,073; 6,494,943; 6,478,863; and 6,472,471, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, which makes use of reacting at least one radical with at least one particle, wherein a radical is generated from the interaction of at least one transition metal compound with at least one organo-halide compound in the presence of one or more particles capable of radical capture, and the like. In yet another embodiment, the at least one carbon black can be modified by using the methods of U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the disclosures of which are incorporated herein by reference.

In one embodiment, mixtures of organic groups can be used. For example, the at least one carbon black may be modified with two or more organic groups, at least one of which has the formula —X(G)-. Alternatively, two or more modified carbon blacks may be provided, each of which has a unique and different attached organic group comprising —X(G)- (such as one carbon black having an attached organic group comprising at least one carboxylic acid group or salt thereof and another carbon black having an attached organic group comprising at least one sulfonic acid group or salt thereof). Other combinations of modified carbon blacks having attached —X(G)-groups can be used. In one embodiment, none of the modified carbon blacks used in combination comprise large polymeric groups for —X(G)-, e.g., those having a MW greater than 2000, greater than 3000, or greater than 4000.

For purposes of at least one embodiment, the amount of organic group attached to the at least one carbon black can be helpful for purposes of adjusting the resistivity and dispersibility of the modified carbon black.

The amount of attached organic groups can be varied in order to attain certain desired performance attributes. In one embodiment, the total amount of attached organic groups ranges from 0.001 to 10.0 µmoles of organic group/m$^2$ surface area of carbon black, as measured by nitrogen adsorption (BET method). In another embodiment, the amount of attached organic groups ranges from 0.1 to 8 µmol/m$^2$, e.g., 0.1 to 6 µmol/m$^2$, from 0.1 to 5 µmol/m$^2$, from 0.05 to 3 µmol/m$^2$. In addition, the modified carbon blacks may further comprise additional attached organic groups. This can result in further improved properties. However, when additional attached groups are present, these are also non-polymeric groups.

Resin

In one embodiment, the at least one resin is selected from acrylics, urethanes, epoxies, polyimides, polyesters and blends and copolymers thereof. Exemplary acrylic resins include styrene-acrylic copolymer resins, e.g., such as those commercially available as JONCRYL 611 resins (Johnson Polymers). Exemplary epoxies include bisphenol-A resin or an epoxy novolac resin.

Liquid Vehicles

In various embodiments, a curable coating composition is provided comprising a liquid vehicle and any of the composites disclosed herein, such as a composite comprising at least on curable resin, and at least one carbon black having the hydrophobic modifications as disclosed herein.

The vehicle may be either an aqueous vehicle or a non-aqueous vehicle. Examples of non-aqueous vehicles according to various embodiments disclosed herein may include: ketone solvents, such as acetone, methyl ethyl ketone, methyl isobutyl ketone, and cyclohexanone; hydrocarbon solvents, such as benzene, toluene, xylene, solvent naphtha No. 1, solvent naphtha No. 2, solvent naphtha No. 3, cyclohexane, ethylbenzene, Solvesso 100, Solvesso 150 and mineral sprit; alcohol solvents, such as methanol, ethanol, iso-propyl alcohol, n-butyl alcohol, sec-butyl alcohol, iso-butyl alcohol, amyl alcohol, and cyclohexanol; ester solvents, such as ethyl acetate, n-butyl acetate, cellosolve acetate, propyleneglycol monomethylether acetate, lactate esters; and ether solvents, such as methyl cellosolve, ethyl cellosolve, high cellosolve and methyl carbitol, ethyl carbitol, ethylcarbitol acetate; alkylene glycols such as diethyleneglycol and propyleneglycol; ethers such as monomethylether; alkyl amides such as dimethyl formamide, and dimethylacetamide; and mixtures thereof. Among these, ketone solvents, such as methyl ether ketone, may be used. These solvents can be used in mixture. The vehicle may be removed from the curable coating compositions by removing 10-80 wt. % thereof by heating the polymer solution under a normal pressure and/or removing the remainder under a reduced pressure.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

EXAMPLES

Example 1

This Example compares the resistivity behavior of polymer composites containing unmodified carbon black versus the exemplary modified carbon blacks as disclosed herein.

Carbon black grades commercially available as VULCAN® XC 72 ("VXC72") from Cabot Corporation were used as the unmodified carbon black control ("CB-unmodified").

A portion of the VXC72 was modified with butyl-4-aminobenzoate ("BAB-modified") and 4-F-aniline ("4-F-modified"). Modification was performed using the diazonium salt reaction to achieve a surface coverage of 3.6 µm/m² for BAB-modified and 6 µm/m² for 4-F-modified.

4-F-aniline modified VXC72 was made according the following procedure. Deionized water, 660 g, was charged to a 2 L glass reactor equipped with overhead stirrer, thermocouple and condenser. VXC72, 80 g, was slowly added to the reactor under mild agitation for 10 minutes. 4-F-aniline (13.55 g) was then added to the reaction mixture drop-wise and stirred for 10 minutes. 30% methanesulfonic acid, 38.9 g was slowly added to the reactor while stirring. The reaction mixture was then heated to 65° C. while stirring. After reaching the desired temperature, 36 g of iso-propanol was slowly added to the reaction mixture. Sodium nitrite 20% aqueous solution, 42.03 g was added slowly drop-wise. The reaction mixture was stirred for 90 min at 65° C. After the reaction mixture cooled down, the treated VXC72 was separated on a Buchner filter, rinsed several times with water and dried overnight at 85° C.

Butyl-4-aminobenzoate (BAB) modified VXC72 was made according the following procedure. Deionized water, 660 g, was charged to a 2 L glass reactor equipped with overhead stirrer, thermocouple and condenser. VXC72, 80 g, was slowly added to the reactor under mild agitation for 10 min. BAB (15.6 g) was then added to the reaction mixture drop-wise and stirred for 10 minutes. 30% methanesulfonic acid, 23.4 g was slowly added to the reactor while stirring. The reaction mixture was heated to 65° C. while stirring. After reaching the desired temperature, 36 g of iso-propanol was slowly added to the reaction mixture. Sodium nitrite 20% aqueous solution, 25.2 g was added slowly drop-wise. The reaction mixture was stirred for 90 min at 65° C. After the reaction mixture cooled down, the treated carbon black was separated on a Buchner filter, rinsed several times with water and dried overnight at 85° C.

For each carbon black sample, polymer composites were prepared with the following resins:
acrylic resin NeoCryl B-814 from DSM NeoResins; and
a two component solvent-based polyurethane system from Bayer made from:
polyacrylate Desmophen A 870A BA, 70% solution in butyl acetate (BA), and
polyisocyanate Desmodur N 3790 BA, 90% solution in BA Solvent dispersions (mill bases) were prepared in Scandex paint shaker. Let down dispersion were coated on steel Q-plates with a 3 mil draw down bar. Films were initially air-dried in a hood, followed by oven drying at 120° C. The final films had a thickness of 10-30 µm.

Volume and resistivity measurements were obtained according to the procedure described in ASTM D257-93 using a Keithley 6517 Electrometer equipped with ETS resistance probe 803B. The voltage for measuring resistance was 5V. Surface resistivity values were taken directly from the computer.

The volume resistivity value ($R_v$) was calculated according the following formula:

$$R_v = (7.1 \times R)/(l \times 10^{-4})$$

where the units for $R_v$ is ohm-cm, R is the film resistance, measured in ohm; 7.1 is an area of the measuring electrode in cm², and l is the measured film thickness in microns.

Figure 4A:
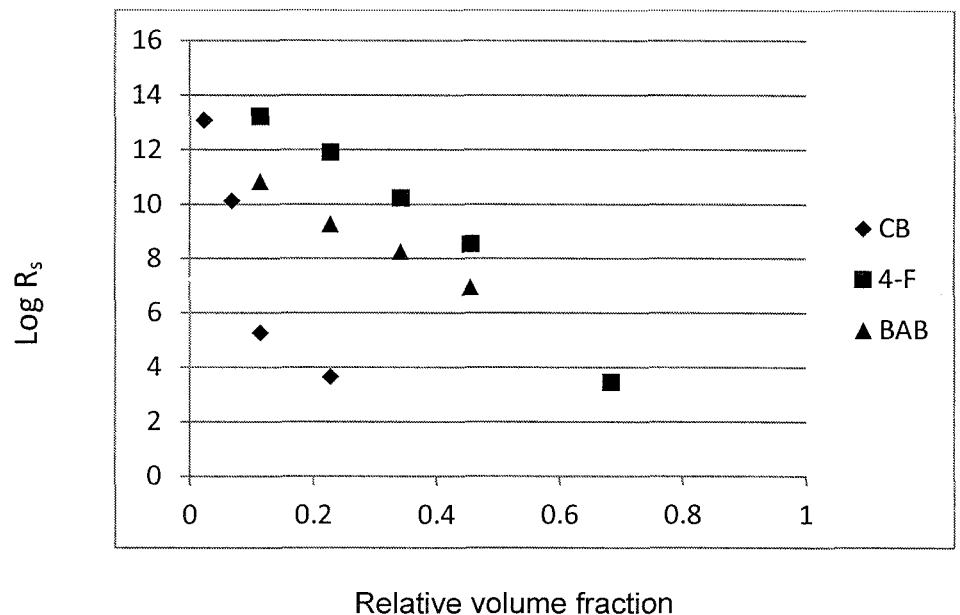
FIG. 4A is a plot of surface resistivity ($R_s$) on the log scale versus relative volume fraction (X) of carbon black for acrylic resin composites containing unmodified carbon black, "CB-unmodified" (♦), and the hydrophobically modified carbon blacks "BAB-modified" (▲) and "4-F-modified" (■)
Figure 4B:
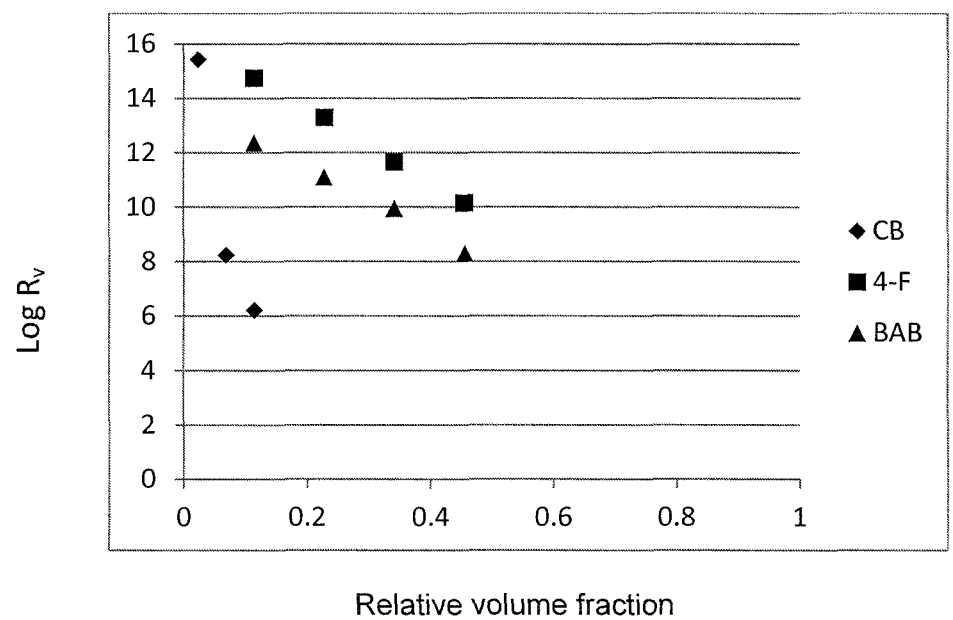
FIG. 4B is a plot of volume resistivity ($R_v$) on the log scale versus relative volume fraction (X) of carbon black for acrylic resin composites containing unmodified carbon black, "CB-unmodified" (♦), and the hydrophobically modified carbon blacks "BAB-modified" (▲) and "4-F-modified" (■)

FIGS. 4A and 4B are respective plots of surface ($R_s$) and volume resistivity ($R_v$) on the log scale versus relative volume fraction (X) for CB-unmodified (♦), BAB-modified (▲), and 4-F-modified (■) CB composites with acrylic resin. FIGS. 5A and 5B show similar plots for the three composites with polyurethane. The linear behavior between log resistivity and relative volume fraction is readily apparent for the modified carbon black composites whereas the unmodified carbon black composite shows percolation at X ~0.2 or less. Within the interval of X ranging from 0.1 to 0.5 (and in some cases from 0.1 to 0.6), the slope of the linear plots (Δ log R/Δ X) for the modified carbon black samples are negative and are less than 15 and in some instances, even less than 10 (e.g., from 5 to 15 or from 5 to 10). Moreover, within the ranges of X from 0.1 to 0.5 (or in some cases from 0.1 to 0.6), the $R^2$ values are 0.9 or greater or even 0.95 or greater. It can also be seen that at within the range of X from 0.1-0.5 or in some instances from 0.1-0.6, the log resistivity values remain above 8 (resistivity greater than $10_8$ ohm/square) or at least above 6 for the modified samples. In contrast, the log resistivity values drop drastically to values below 6 for the unmodified carbon at low carbon loading.

Thus, it has been demonstrated that the hydrophobic modification changes the resistivity behavior of carbon black/polymer composites over a wide carbon concentration range.

Example 2

This Example demonstrates the oligomeric nature of carbon black modified with 4-F-aniline.

Carbon black grades commercially available as REGAL® 330 ("R330") from Cabot Corporation were modified with 4-F-aniline in an aqueous slurry.

Reaction in slurry. Reactions in slurry were carried out in a 2 L three-neck glass reactor with an overhead paddle mixer. A mantle heater connected through a temperature control unit with thermocouple was used to stabilize the temperature in a reactor. 250 g of water was charged to the reactor, followed by the addition of 120 g of R330. The reaction mixture was brought to 60° C. In a separate beaker 4-FA (7.52 g) was slowly added to a nitric acid solution (38.1 g @11.4%) while stirring and slow heating until the neutralized aniline salt dissolved. The aniline salt solution was added drop-wise to the carbon black slurry under mixing. After about 10 minutes, sodium nitrite solution was added (23.4 g at 20%) slowly drop-wise. The reaction was mixed for about 1 h at 60° C. after the completion of $NaNO_2$ addition. The reaction mixture was discharged into a Buchner funnel, filtered under vacuum, rinsed several times with water, and dried at 85° C. overnight.

When a dry treated carbon black was Soxhlet extracted with MEK, GC/MS and LC/MS data show peaks having a retention time greater than 22 min, indicating the presence of higher molecular species. LC/MS analysis of MEK extracts confirmed the formation of oligomeric components as indicated by three groups of oligomers with retention times of 1.9, 2.4 and ~7 min. The areas of these peaks as determined by UV adsorption. FIGS. 6A-C are mass-spectra (RT) of LCMS of the MEK extract 4-FA modified composite, featuring the 1.9, 2.4, and ~7 min retention time regions, respectively. Masses as high as 1444 au are evident. Assuming that the mass of the fluorophenyl radical is 95 au, the MEK extract might contain oligomers with up to 15 fluorophenyl groups. This sample shows the highest masses in comparison with other samples, which are typically in 900-1000 au range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A resistive composite comprising:
at least one resin;
at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic, and wherein:
the resistive composite has a volume resistivity, $R_v$, at a relative volume fraction, $X_{CB}$, of the at least one carbon black in the composite, where $R_v$ is at least $10^6$ ohm-cm; and
log $R_v$ has a substantially linear relationship with $X_{CB}$ when $X_{CB}$ is varied from 0.1 to 0.5.

2. The resistive composite of claim 1, wherein $X_{CB}$ ranges from 0.1 to 0.6.

3. The resistive composite of claim 1, wherein $R_v$ ranges from $10^6$ to $10^{12}$ ohm-cm.

4. The resistive composite of claim 1, wherein the substantially linear relationship has a goodness of fit value ($R^2$) of at least 0.8.

5. The resistive composite of claim 1, wherein the substantially linear relationship is defined as log $R_v$ being directly proportional to $-m.X_{CB}$, wherein m is greater than 0 and no more than 15.

6. The resistive composite of claim 1, wherein the composite has a surface resistivity, $R_s$, of at least $10^6$ ohm/square.

7. The resistive composite of claim 1, wherein the at least one organic group has a molecular weight of 2000 or less.

8. The resistive composite of claim 1, wherein G comprises at least one group selected from alkyls, carboxylic acid esters, amides, alcoxyls, ethers, ketones, acyls, and halides.

9. The resistive composite of claim 1, wherein —X(G)- is a monomer and the at least one organic group comprises an oligomer.

10. The resistive composite of claim 9, wherein the at least one organic group comprises the formula —[X(G)]- and n ranges from 1 to 20.

11. The resistive composite of claim 1, wherein the at least one carbon black is further modified with adsorbed oligomers derived from the —X(G)- monomers.

12. A substrate coated with the resistive composite of claim 1.

13. The substrate of claim 12, wherein the substrate is selected from a charge roller of an electrostatic image forming apparatus, a transfer roller or belt of an electrostatic image forming apparatus, and a developer-carrying roller for carrying a developer layer thereon positioned in a toner cartridge.

14. An electrostatic image forming apparatus comprising:
an electrostatic image-bearing member; and
at least one of:
a charge roller;
a transfer roller or belt; and
a developer-carrying roller for carrying a developer layer thereon positioned in a toner cartridge,
wherein the at least one of the charge roller, the transfer roll or belt, and the developer-carrying roller has an outer layer comprising the resistive composite of claim 1.

15. A method of making a coated substrate, comprising:
applying a composition onto a substrate, the composition comprising:
at least one resin;
at least one carbon black having a surface hydrophobically modified with at least one organic group, the at least one organic group having a molecular weight of 4000 or less and comprising the formula —X(G)-, wherein X is directly attached to the at least one carbon black and is selected from arylene, heteroarylene, and alkylene, G is a substituent of X, and —X(G)- is nonionic; and
sufficient vehicle to disperse the carbon black, and curing the composition to form the coated substrate
wherein:
the resistive composite has a surface resistivity, $R_s$, at a relative volume fraction, $X_{CB}$, of the at least one carbon black in the coating, where $R_s$ is at least $10^6$ ohm/square; and
log $R_s$ has a substantially linear relationship with $X_{CB}$ when $X_{CB}$ is varied from 0.1 to 0.5.

16. The method of claim 15, wherein the at least one resin is curable and is selected from acrylics, urethanes, epoxies, polyimides, polyesters, and blends and copolymers thereof.

17. A resistive composite comprising: at least one resin; at least one carbon black having a surface hydrophobically modified with at least one organic group, the at least one organic group having a molecular weight of 4000 or less and comprising the formula —[X(G)]$_n$-, where X is directly attached to the at least one carbon black and is selected from arylene, heteroarylene, and alkylene, G is a substituent of X, and —X(g)- is nonionic, and n ranges from 1 to 20, and wherein: the resistive composite has a volume resistivity, $R_v$, at a relative volume fraction, $X_{CB}$, of the at least one carbon black in the composite, where $R_v$ is at least $10^6$ ohm-cm, and log $R_v$ has a substantially linear relationship with $X_{CB}$ when $X_{CB}$ is varied from 0.1 to 0.5.

18. The resistive composite of claim 17, wherein the composite has a surface resistivity, R, of at least $10^6$ ohm/square.

19. The resistive composite of claim 17, wherein G comprises at least one group selected from alkyls, carboxylic acid esters, amides, alcoxyls, ethers, ketones, acyls, and halides.

* * * * *

UNITED STATES PATENT AND TRADEMARK OFFICE
CERTIFICATE OF CORRECTION

PATENT NO. : 9,546,286 B2  Page 1 of 1
APPLICATION NO. : 14/233457
DATED : January 17, 2017
INVENTOR(S) : Eugene N. Step et al.

It is certified that error appears in the above-identified patent and that said Letters Patent is hereby corrected as shown below:

In the Claims

At Column 20, Line 18, "-[X(G)]-" should read -- -[X(G)]$_n$- --

Signed and Sealed this
Sixth Day of June, 2017

Michelle K. Lee
*Director of the United States Patent and Trademark Office*